UNITED STATES PATENT OFFICE.

MARKUS GUGGENHEIM, OF BASEL, SWITZERLAND, ASSIGNOR TO THE HOFFMANN-LA ROCHE CHEMICAL WORKS, OF NEW YORK, N. Y., A CORPORATION OF NEW YORK.

COMPLEX SILVER SALTS OF α-AMINO ACIDS.

1,417,167. Specification of Letters Patent. Patented May 23, 1922.

No Drawing. Application filed September 30, 1919. Serial No. 327,557.

*To all whom it may concern:*

Be it known that I, MARKUS GUGGENHEIM, a citizen of Switzerland, and a resident of Basel, Switzerland, have invented certain new and useful Improvements in Complex Silver Salts of α-Amino Acids, of which the following is a specification.

Complex silver salts of α-amino acids have heretofore been unknown. It has already been described (Curtius, Journal für praktische Chemie, Neue Folge, vol. 26, 1882, pages 164–167) that glycin is brought to act upon silver oxide, whereby the reaction product is boiled down till crystallization of the silver amino acetate sets in. The silver salt resulting therefrom and containing 59.33% of silver is, however, the normal silver salt of amino acetic acid and does not contain the silver in complex binding.

It has been found that by causing an excess of α-amino acids to act upon silver oxide as well as upon different organic and inorganic silver salts, complex silver salts of α-amino acids may be obtained.

The conditions for the formation of complex silver salts from an excess of α-amino acids vary according to the silver compound chosen as starting material.

The formation of the complex salt generally makes itself noticed by an easier solubility of the reaction product. It may further be ascertained by the fact that the aqueous silver salts no longer answer to all reactions of the silver cation. So for instance the addition of a solution of sodium hydroxide or sodium carbonate causes no precipitate of silver oxide or silver carbonate. Silver salts, which are not soluble in water without decomposition setting in, can be heated without undergoing any alteration, after having previously added an amino acid favoring the formation of complex salts. The aqueous solutions of the complex silver compounds are characterized in that they are a great deal more stable than the aqueous solutions of silver salts. On being left to stand for some time no reduced silver is precipitated. The complex silver compounds of α-amino acids do not precipitate albumin. They have no irritating effect upon the mucous membranes. This latter property as well as their stability render them suitable for therapeutic purposes.

Example 1.

75 parts of glycin are dissolved in 120 parts of water and to this solution are added 23 parts of silver oxide freshly precipitated. On heating the silver oxide is nearly all dissolved. The hot solution is filtered, put into a freezing mixture and caused quickly to coagulate by stirring. A colorless salt in the shape of small white plates is precipitated. After being separated from the mother liquor the crystals are washed with a little water and, in the given case, crystallized from water containing glycin.

In order to obtain a good yield of the complex silver compound it is advisable not to use more than $\frac{1}{5}$ equivalent of silver oxide to one equivalent of glycin. One may also start from Curtius's silver salt and cool this quickly below 0° C. in presence of an excess of glycin, in order to obtain the more stable silver compound.

The complex silver compound dissolves pretty easily in water. The solubility is rendered still greater by the addition of glycin or an other α-amino acid. The aqueous solution has an alkaline reaction upon litmus. On the addition of a solution of sodium hydroxide or sodium carbonate the solution does not become turbid until after some considerable length of time. After separating the silver compound the mother liquor may again be saturated with glycin and by the addition of silver oxide further quantities of the complex silver compound may be obtained.

Example 2.

17 parts of silver nitrate are dissolved in a little water, added to a saturated solution of 37.2 parts of glycin and boiled down in vacuo at a moderate temperature. The crystalline mass thereby obtained is easily soluble in water its reaction is neutral. The addition of a solution of sodium hydroxide or sodium carbonate produces no precipitate.

Ringer's solution (which is a solution of .01 g. of sodium bicarbonate, .075 g. of potassium chloride, .01 g. of calcium chloride and .6 g. of sodium chloride in 100 ccm. of water), produces a milky precipitate of silver chloride.

*Example 3.*

15.6 parts of silver sulfate are finely ground with 75 parts of glycin. The mixture is much more easily soluble in water than the silver sulfate and shows the same reactions as the complex silver compound described in Example 1.

*Example 4.*

By pulverizing $\alpha$-alanin with an equivalent quantity of freshly precipitated silver oxide the silver salt of alanin $CH_3CH-(NH_2)COO\ Ag$ is produced. 36 parts of $\alpha$-alanin are dissolved in as little water as possible and 19.2 parts of the silver alanin added to the concentrated solution. The salt is easily dissolved. The reaction product is then filtered and boiled down till dry; it will then show a slight brown coloring. The remaining crystalline mass is easily soluble in water and reacts in the same manner as the corresponding silver compound of glycin.

*Example 5.*

27.4 parts of silver carbamide are carefully ground together with 75 parts of glycin. A light yellow powder is obtained, which is soluble in water in the proportion of 3:100. Silver carbamide itself does not dissolve in water. The aqueous solution is colorless. Its reaction upon litmus is alkaline. With a solution of sodium hydroxide it remains clear.

*Example 6.*

16.8 parts of silver acetate are dissolved with 37.5 parts of glycin in water and boiled down in vacuo at a temperature not exceeding 30° C., light being excluded. There remains a white powder, the solubility of which in water is about five time greater than that of silver acetate. The reaction of the solution upon litmus is slightly alkaline, with a solution of sodium hydroxide it remains clear.

*Example 7.*

In order to produce the complex glycin silver salicylate one grinds 24.6 parts of silver salicylate together with 75 parts of glycin. A white powder is obtained, which is more easily soluble in water than silver salicylate. The solution remains clear with sodium hydroxide solution and its reaction upon litmus is neutral.

In the same manner the other $\alpha$-amino acids may be used for the manufacture of complex silver salts. With aromatic amino acids (anthranilic acid, para-amino benzoic acid) it is not possible to obtain complex compounds, likewise not with betaines.

When in my claims I refer to "non-complex silver compounds", I refer to the silver compounds which, as hereinabove disclosed, are used in my process, namely silver oxide, organic silver salts and inorganic silver salts.

When I refer, in my claims, to the use of "a sufficient excess" of $\alpha$-amino acid, I mean that the excess must be such as to make possible the formation of the complex silver salts hereinabove described.

I claim:

1. As new products the complex silver salts of $\alpha$-amino acids which can be obtained by treating non-complex silver compounds with a quantity of $\alpha$-amino acid whose weight is not less than at least five times the weight of such compounds (calculated as silver oxide actually or potentially present therein) which would be needed to form the corresponding normal salts, which complex salts have the following characteristics: they are much more easily soluble than the normal silver salts of $\alpha$-amino acids; their solutions are more stable than those of the normal silver salts of $\alpha$-amino acids; they do not precipitate albumin, and have no irritating effect upon the mucous membrane.

2. As a new product the complex silver salt of glycin, which can be obtained by treating a non-complex silver compound with a quantity of glycin, whose weight is not less than at least five times the weight of such compound (calculated as silver oxide actually or potentially present therein) which would be needed to form the corresponding normal salt, which complex salt has the following characteristics: It is much more easily soluble than the normal silver salts of $\alpha$-amino acids; its solution is more stable than that of the normal silver salts of $\alpha$-amino acids; it does not precipitate albumin, and has no irritating effect upon the mucous membrane.

3. The process for the manufacture of complex sliver salts of $\alpha$-amino acids which consists in treating a non-complex silver compound with a quantity of $\alpha$-amino acid whose weight is not less than at least five times the weight of such compound (calculated as silver oxide actually or potentially present therein) which would be needed to form the corresponding normal salt.

4. The process for the manufacture of complex silver salts of $\alpha$-amino acid which comprises treating an inorganic non-complex silver compound with a quantity of $\alpha$-amino acid whose weight is not less than at least five times the weight of such compound (calculated as silver oxide actually or potentially present therein) which would be needed to form the corresponding normal salt.

5. The process for the manufacture of complex silver salts of α-amino acids which comprises treating silver oxide with a quantity of α-amino acid at least five times the weight of silver oxide which would be needed to form the corresponding normal salt.

6. The process for the manufacture of silver salts of glycin, which consists in treating silver oxide with a quantity of glycin whose weight is not less than at least five times the weight of the silver oxide which would be needed to form the corresponding normal salt, and crystallizing the solution obtained at a temperature below 0° C.

In witness whereof I have hereunto set my hand.

MARKUS GUGGENHEIM.

Witnesses:
 HEINRICH KUBLI,
 ALBERT HOFFMANN.